United States Patent [19]

Herbrechtsmeier et al.

[11] Patent Number: 5,391,592
[45] Date of Patent: Feb. 21, 1995

[54] CONTACT LENSES COMPRISING LIPOPHILISED CYCLODEXTRINS

[75] Inventors: Peter Herbrechtsmeier, Königstein; Horst Schäfer, Aschaffenburg; Bernhard Seiferling, Goldbach; Klaus Wenke, Wiesbaden; Gerhard Wenz, Mainz, all of Germany

[73] Assignee: Ciba-Geigy Corporation, Ardsley, N.Y.

[21] Appl. No.: 101,221

[22] Filed: Aug. 3, 1993

[30] Foreign Application Priority Data

Aug. 5, 1992 [EP] European Pat. Off. ........ 92810599.8

[51] Int. Cl.$^6$ ............ C08B 37/16; C08G 77/38; C02B 1/04
[52] U.S. Cl. .................... 523/107; 524/868; 525/54.2; 528/15; 536/4.1; 536/103
[58] Field of Search ........... 523/107; 536/4.1, 103; 351/160 H; 524/868; 528/15; 525/54.2

[56] References Cited

U.S. PATENT DOCUMENTS 4,973,680 11/1990 Billmers ........................... 536/103

FOREIGN PATENT DOCUMENTS 0317377 5/1989 European Pat. Off. .
2646672 11/1990 France .
9207056 4/1992 WIPO .

OTHER PUBLICATIONS

Chemical Abstracts, vol. 116, No. 18, May 4, 1992, Columbus, Ohio, U.S.; Abst. No. 174900x, Von der Bey E., "Synthesis and Characterization of Immobilized Lipophilic Cyclodextrins".
Chemical Abstracts, vol. 95, No. 8, Aug. 24, 1981, Columbus, Ohio, U.S.; abstract No. 62402c, Maciejewski, M., "Adducts of Cyclodextrins with Siloxane Oligomers".

Primary Examiner—Paul R. Michl
Assistant Examiner—Andrew E. C. Merriam
Attorney, Agent, or Firm—Edward McC. Roberts; R. Scott Meece

[57] ABSTRACT

A process for producing a contact lens and a contact lens comprising a crosslinked lipophilised cyclodextrin derivative, wherein each repeating cyclodextrin unit includes at least one polysiloxane group. The process for producing the contact lens includes the reaction of a cyclodextrin with a polysiloxane.

11 Claims, No Drawings

CONTACT LENSES COMPRISING LIPOPHILISED CYCLODEXTRINS

The present invention relates to contact lenses comprising specially modified cyclodextrins, to the manufacture of those contact lenses and to the use of the specially modified cyclodextrins in the manufacture of contact lenses.

Cyclodextrins are known. They are naturally occurring cycloamyloses. Known in particular are α-cyclodextrin, which consists of six units, β-cyclodextrin, which consists of seven units, and γ-cyclodextrin, which consists of eight units. Unit in this context in each case denotes a ring of formula A

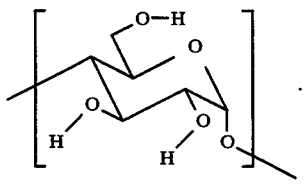

(A)

Six, seven or eight rings of formula A, as the case may be, form a closed cycle having α-(1-4)-bonded glucopyranose units, depending on whether the cyclodextrin is α-cyclodextrin, which contains six rings of formula A, β-cyclodextrin, which contains seven rings of formula A, or γ-cyclodextrin, which contains 8 rings of formula A. Each cyclodextrin molecule is thus a macromolecule with a cavity. Cyclodextrins containing more than 8 units of formula A are also known. They are usually obtained in the form of mixtures which can, if necessary, be separated.

The cyclodextrins used in accordance with the invention are so modified that they no longer contain exclusively free hydroxy groups. Instead, some or all of the hydroxy groups are etherified. In addition some, but at least one, of the etherified groups are functionalised such that they can be reacted with hydrogen-polysiloxanes, for example with α,ω-di-hydrogen-polysiloxanes. That reaction results not only in a further functionalisation of an individual cyclodextrin molecule but, owing to the multi- or bi-functionality for example of the α,ω-dihydrogen-polysiloxanes, in the crosslinking of different cyclodextrin molecules with one another. It is by that means possible to produce a material comprising polymeric cyclodextrin which, inter alia as a result of the presence of siloxane bridges, has more or less strongly pronounced lipophilic properties.

That material has surprisingly proved extraordinarily suitable for the manufacture of contact lenses. For example it is possible to adjust the hydrophilic and lipophilic properties of the material by varying the chain length of the siloxane bridges. In addition there are further parameters that permit optimisation of the properties desired for the purpose in question. Those include the nature and number of the ether groups. The contact lenses obtainable from the said material are colourless, transparent, have a good mechanical stability and meet the high requirements made of contact lenses, for example also in respect of their contact angle. The contact lenses according to the invention are particularly attractive, however, in view of their oxygen permeability (Dk). In most cases the Dk values are approximately from 100 to 200 with a maximum value of up to 500.

The present invention therefore relates to a contact lens comprising a crosslinked lipophilised cyclodextrin derivative which is obtainable by reacting a compound of formula I

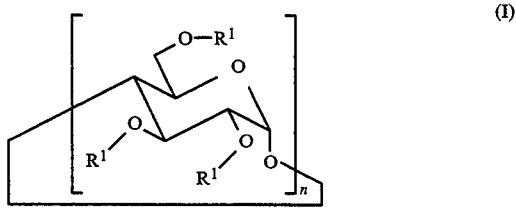

with a compound of formula II

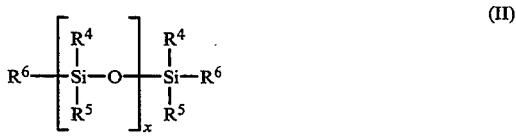

in which formulae n is an integer of from 6 to 15, the radicals $R^1$ are each, independently of the others, hydrogen, $R^2$ or $R^3$ wherein, of the (3 times n) radicals $R^1$, at least one radical $R^1$ has the meaning of $R^3$ and the remaining radicals $R^1$ are hydrogen or have the meaning of $R^2$, $R^2$ being unsubstituted or halogen-substituted alkyl or alkyl-substituted aryl and $R^3$ being unsubstituted or halogen-substituted alkenyl, x is an integer of from 1 to 10 000, and $R^4$, $R^5$ and $R^6$ are each, independently of the others, hydrogen, alkyl, phenyl or hydroxy, with the proviso that at least two of the radicals $R^4$, $R^5$ and $R^6$ in a compound of formula II are hydrogen.

Preferably, a maximum of about 50% of the radicals $R^4$, $R^5$ and $R^6$ in a compound of formula II are hydrogen.

Radicals and groups designated "lower", such as lower alkyl, lower alkenyl etc., denote radicals and groups having up to 7 carbon atoms, preferably up to 4 carbon atoms. Radicals such as alkyl, alkenyl, alkylene or the like are unbranched or branched radicals of that kind.

Alkyl is especially unbranched or branched alkyl having up to 12 carbon atoms, preferably lower alkyl, and is e.g. methyl, ethyl, propyl, 2-propyl, butyl, tert-butyl, pentyl, hexyl, octyl or decyl.

Halogen is fluorine, chlorine or bromine, but may also be iodine and, according to the invention, is preferably fluorine.

Aryl is especially an aromatic hydrocarbon radical and is preferably naphthyl or phenyl.

Alkenyl is especially unbranched or branched alkenyl having up to 12 carbon atoms, preferably lower alkenyl, and is e.g. ethenyl, propenyl, butenyl, pentenyl, hexenyl, octenyl or decenyl. Alkenyl may also be a polyunsaturated radical, that is e.g. lower alk-dien-yl, such as hexadienyl or pentadienyl, e.g. hexa-2,5-dien-1-yl. The carbon-carbon double bond present in the alkenyl radicals may be located in a terminal position or in the chain. In the case of polyunsaturated radicals at least one carbon-carbon double bond may be in a terminal position.

Halogen-substituted alkyl is especially fluorine-substituted alkyl, such as fluoro-lower alkyl, e.g. trifluoromethyl, trifluoroethyl, pentafluoroethyl, heptafluorobutyl or nonafluorobutyl.

Alkyl-substituted aryl is especially phenyl mono- to tri-substituted by lower alkyl, such as, e.g., tolyl, ethylphenyl, xylyl, butylphenyl or pentylphenyl.

Halogen-substituted alkenyl is especially fluorine-substituted alkenyl, such as fluoro-lower alkenyl, e.g. trifluoroethenyl, pentafluoropropenyl, heptafluorobutenyl or nonafluorohexenyl. Halogen-substituted alkenyl may also have one or more carbon-carbon double bonds and that bond may be located in a terminal position or in the chain. In the case of polyunsaturated radicals at least one carbon-carbon double bond may be in a terminal position.

The index n represents an integer of from 6 to 15, especially an integer of from 6 to 10, and is preferably the integer 6, 7 or 8. The index n is especially the integer 7, that is to say the cyclodextrins used are prepared from β-cyclodextrin. It is also possible to use mixtures of cyclodextrins having different numbers of α-(1-4)-bonded glucopyranose units, that is to say the index n in a polymeric cyclodextrin used in accordance with the invention for contact lenses may have different values ranging from 6 to 15.

$R^1$ is preferably $R^2$ or $R^3$. Of the (3 times n) radicals $R^1$ (e.g. the 18 radicals $R^1$ in the case where n is 6, the 21 radicals $R^1$ in the case where n is 7 or the 24 radicals $R^1$ in the case where n is 8), preferably from 50% to 100% of a third of those radicals have the meaning of $R^3$, whilst the other radicals $R^1$ have the meaning of $R^2$. The radicals $R^3$ present are generally uniformly distributed in the rings of formula I. They are furthermore preferably in the 3-position. For the purpose of illustration, an α-cyclodextrin type in which 100% of a third of the radicals $R^1$, uniformly in the 3-position, have the meaning of $R^3$, whilst 100% of the other two thirds of the radicals $R^1$ have the meaning of $R^2$ is reproduced in the following as formula IA:

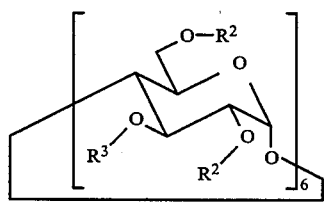

(IA)

On the other hand, an α-cyclodextrin type in which only 50% of a third of the radicals $R^1$ have the meaning of $R^3$ would be represented by a formula corresponding to formula IA in which, of course, not all of the 6 rings of the cyclodextrin would have a radical $R^3$ but only every other ring, whilst all of the other radicals $R^1$, in this case 15 radicals $R^1$, would have the meaning of $R^2$.

Especially preferably, 100% of a third of the radicals $R^1$, uniformly distributed in the rings of formula I, have the meaning of $R^3$, whilst the other two thirds of the radicals $R^1$ have the meaning of $R^2$. Particularly preferably, the radicals $R^3$ are uniformly located in the 3-position. That arrangement, an example of the case in which the index n is six, is reproduced in formula IA.

The radicals $R^2$ are preferably alkyl, especially lower alkyl and, more especially, lower alkyl having from 4 to 7 carbon atoms, such as butyl, pentyl or hexyl.

The radicals $R^3$ are preferably alkenyl, especially lower alkenyl and, more especially, lower alkenyl having from 3 to 6 carbon atoms, such as allyl, pentenyl or hexenyl.

The index x is from 1 to 10 000, preferably from 1 to 1000, especially from 1 to 500, more especially from 1 to 200 or from 1 to 100 and even more especially from 2 to 85.

In connection with the radicals $R^4$, $R^5$ and $R^6$, at least two, but preferably not more than about 50% of all of the radicals $R^4$, $R^5$ and $R^6$, must be hydrogen. It is especially preferred for not more than about 25% of all radicals $R^4$, $R^5$ and $R^6$ to be hydrogen. Particularly preferably precisely two of the radicals $R^4$, $R^5$ and $R^6$ are hydrogen. Those radicals are preferably the two $R^6$ radicals.

A preferred combination of meanings in which two silicon-hydrogen bonds are located in terminal positions is as follows:

The radicals $R^4$ and $R^5$ are preferably alkyl or phenyl, especially lower alkyl, such as methyl or ethyl, or phenyl. An especially preferred meaning of the radicals $R^4$ and $R^5$ is lower alkyl having up to 4 carbon atoms, such as methyl. The radicals $R^6$ are hydrogen. Compounds of formula II in which the radicals $R^4$, $R^5$ and $R^6$ have those meanings are α,ω-dihydrogen-polysiloxanes.

Another preferred combination of meanings in which the silicon-hydrogen bonds are not necessarily located in terminal positions is as follows:

The radicals $R^4$, $R^5$ and $R^6$ are hydrogen, alkyl or phenyl, especially hydrogen, lower alkyl, such as methyl or ethyl, or phenyl, with the proviso that at least two of the radicals $R^4$, $R^5$ and $R^6$, and preferably a maximum of 50% of the radicals $R^4$, $R^5$ and $R^6$, are hydrogen.

The present invention therefore relates especially to a contact lens comprising a crosslinked lipophilised cyclodextrin derivative which is obtainable by reacting a compound of formula I with a compound of formula II, in which formulae n is an integer of from 6 to 15, the radicals $R^1$ are each, independently of the others, hydrogen, $R^2$ or $R^3$ wherein, of the (3 times n) radicals $R^1$, at least one radical $R^1$ has the meaning of $R^3$ and the remaining radicals $R^1$ are hydrogen or have the meaning of $R^2$, $R^2$ being unsubstituted alkyl and $R^3$ being unsubstituted alkenyl, x is an integer of from 1 to 1000, and $R^4$, $R^5$ and $R^6$ are each, independently of the others, hydrogen, alkyl or phenyl, at least two of the radicals $R^4$, $R^5$ and $R^6$ being hydrogen.

Preferred among those is a contact lens comprising a crosslinked lipophilised cyclodextrin derivative which is obtainable by reacting a compound of formula I with a compound of formula II, in which formulae n is an integer of from 6 to 15, the radicals $R^1$ in the 2-position and in the 6-position are unsubstituted alkyl and the radicals $R^1$ in the 3-position are unsubstituted alkenyl, x is an integer of from 1 to 1000 and $R^4$, $R^5$ and $R^6$ are each, independently of the others, hydrogen, alkyl or phenyl, at least two of the radicals $R^4$, $R^5$ and $R^6$ being hydrogen.

Also preferred among those is a contact lens comprising a crosslinked lipophilised cyclodextrin derivative which is obtainable by reacting a compound of formula I with a compound of formula 11, in which formulae n is an integer of from 6 to 15, the radicals $R^1$ in the 2-position and in the 6-position are unsubstituted alkyl, and at least 50% of the radicals $R^1$ in the 3-position are unsubstituted alkenyl whilst the remaining percentage of the radicals $R^1$ in the 3-position are unsubstituted alkyl, x is an integer of from 1 to 1000 and $R^4$, $R^5$ and $R^6$ are each, independently of the others, hydrogen, alkyl or phenyl, at least two of the radicals $R^4$, $R^5$ and $R^6$ being hydrogen.

Furthermore preferred among those is a contact lens comprising a crosslinked lipophilised cyclodextrin derivative which is obtainable by reacting a compound of formula I with a compound of formula H, in which formulae n is an integer of from 6 to 15, the radicals $R^1$ in the 2-position and in the 6-position are unsubstituted alkenyl and the radicals $R^1$ in the 3-position are hydrogen, x is an integer of from 1 to 1000 and $R^4$, $R^5$ and $R^6$ are each, independently of the others, hydrogen, alkyl or phenyl, at least two of the radicals $R^4$, $R^5$ and $R^6$ being hydrogen.

The present invention relates especially preferably to a contact lens comprising a crosslinked lipophilised cyclodextrin derivative which is obtainable by reacting a compound of formula I with a compound of formula II, in which formulae n is an integer of from 6 to 15, the radicals $R^1$ are each, independently of the others, hydrogen, $R^2$ or $R^3$ wherein, of the (3 times n) radicals $R^1$, from 50% to 100% of a third of those radicals have the meaning of $R^3$ whilst the other radicals $R^1$ are hydrogen or have the meaning of $R^2$, $R^2$ being unsubstituted alkyl and $R^3$ being unsubstituted alkenyl, x is an integer of from 1 to 500 and $R^4$, $R^5$ and $R^6$ are each, independently of the others, hydrogen, alkyl or phenyl, at least two of the radicals $R^4$, $R^5$ and $R^6$ being hydrogen.

The present invention therefore relates most especially to a contact lens comprising a crosslinked lipophilised cyclodextrin derivative which is obtainable by reacting a compound of formula III

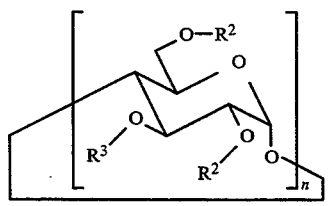
(III)

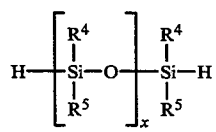
(IV)

in which formulae
n is an integer of from 6 to 15,
$R^2$ is unsubstituted alkyl,
$R^3$ is unsubstituted alkenyl,
x is an integer of from 1 to 500 and
$R^4$ and $R^5$ are each, independently of the other, alkyl or phenyl.

The index n in a compound of formula III is preferably 6, 7 or 8.

Equally, the present invention relates also to a contact lens comprising a crosslinked lipophilised cyclodextrin derivative which is obtainable by reacting a compound of formula III as defined above with a compound of formula II in which x is an integer of from 1 to 500 and the radicals $R^4$, $R^5$ and $R^6$ are hydrogen, alkyl or phenyl, with the proviso that a minimum of two of the radicals $R^4$, $R^5$ and $R^6$, and a maximum of about 25% of the radicals $R^4$, $R^5$ and $R^6$, are hydrogen.

The present invention relates especially to a contact lens comprising a crosslinked lipophilised cyclodextrin derivative which is obtainable by reacting a compound of formula III with a compound of formula IV, in which formulae
n is an integer 6, 7 or 8,
$R^2$ is lower alkyl having from 4 to 7 carbon atoms,
$R^3$ is lower alkenyl having from 3 to 6 carbon atoms,
x is an integer of from 1 to 200 and
$R^4$ and $R^5$ are each, independently of the other, lower alkyl or phenyl.

The present invention relates also to a contact lens comprising a crosslinked lipophilised cyclodextrin derivative which has repeating sub-units of formula V

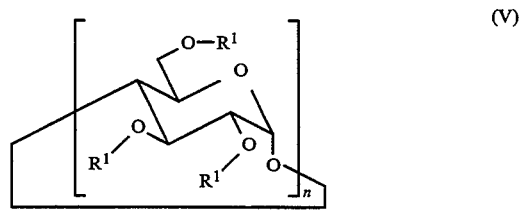
(V)

in which
n is an integer of from 6 to 15,
the radicals $R^1$ are each, independently of the others, hydrogen, $R^2$ or $R^7$, wherein, of the (3 times n) radicals $R^1$, at least one radical $R^1$ has the meaning of $R^7$ and the remaining radicals $R^1$ are hydrogen or have the meaning of $R^2$,
$R^2$ being unsubstituted or halogen-substituted alkyl or alkyl-substituted aryl and
$R^7$ being a di- or poly-valent radical of formula VI

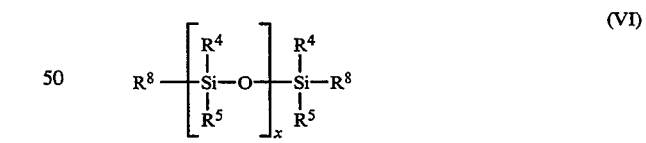
(VI)

in which
x is an integer of from 1 to 10 000, and
$R^4$, $R^5$ and $R^8$ are each, independently of the others, hydrogen, alkyl, unsubstituted or halogen-substituted alkylene or alkenylene, phenyl or hydroxy, with the proviso that at least two of the radicals $R^4$, $R^5$ and $R^8$ in a radical of formula VI are unsubstituted or halogen-substituted alkylene or alkenylene.

Preferably a maximum of about 50% of the radicals $R^4$, $R^5$ and $R^8$ in a radical of formula VI are hydrogen.

The valency of the radical of formula VI depends on the number of substituents $R^4$, $R^5$ and $R^8$ that are unsubstituted or halogen-substituted alkylene or alkenylene. The radical of formula VI is at least divalent, preferably di- to penta-valent, and especially preferably divalent.

Alkylene is especially unbranched or branched alkylene having up to 12 carbon atoms, preferably lower alkylene, and is e.g. ethylene, propylene, butylene, pentylene, hexylene, octylene or decylene.

Alkenylene is especially unbranched or branched alkenylene having up to 12 carbon atoms, preferably lower alkenylene, and is e.g. butenylene, pentenylene, hexenylene, octenylene or decenylene.

Halogen-substituted alkylene is especially fluorine-substituted alkylene, such as fluoro-lower alkylene, e.g. difluoroethylene, tetrafluoroethylene, hexafluorobutylene or octafluorobutylene.

Halogen-substituted alkenylene is especially fluorine-substituted alkenylene, such as fluoro-lower alkenylene, e.g. hexafluorobutenylene or octafluorohexenylene. A carbon-carbon double bond present in the alkenylene radicals or in the halogen-substituted alkenylene radicals may be located in a terminal position or in the chain.

The index n is an integer of from 6 to 15, especially an integer of from 6 to 10, and preferably the integer 6, 7 or 8. The index n is especially the integer 7, that is to say the cyclodextrins used are prepared from β-cyclodextrin. It is also possible to use mixtures of cyclodextrins having different numbers of α-(1-4)-bonded glucopyranose units, that is to say the index n in a polymeric cyclodextrin used in accordance with the invention for contact lenses can have different values ranging from 6 to 15.

$R^1$ is preferably $R^2$ or $R^7$. Of the (3 times n) radicals $R^1$ (e.g. the 18 radicals $R^1$ in the case where n is 6, the 21 radicals $R^1$ in the case where n is 7 or the 24 radicals $R^1$ in the case where n is 8), preferably from 50% to 100% of a third of those radicals have the meaning of $R^7$, whilst the other radicals $R^1$ have the meaning of $R^2$. The radicals $R^7$ present are usually uniformly distributed in the rings of formula V. In addition they are preferably located in the 3-position. For the purpose of illustration an α-cyclodextrin type in which 100% of a third of the radicals $R^1$, uniformly in the 3-position, have the meaning of $R^7$, whilst 100% of the other two thirds of the radicals $R^1$ have the meaning of $R^2$ is shown in the following as formula VA:

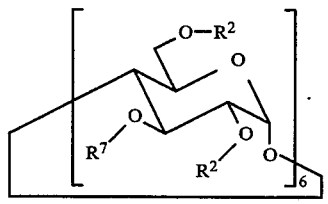
(VA)

On the other hand, an α-cyclodextrin type in which only 50% of a third of the radicals $R^1$ have the meaning of $R^7$ would be represented by a formula corresponding to formula VA in which, of course, not all of the 6 rings of the cyclodextrin would have a radical $R^7$ but only every other ring, whilst all of the other radicals $R^1$, in this case 15 radicals $R^1$, would have the meaning of $R^2$.

Especially preferably 100% of a third of the radicals $R^1$, uniformly distributed in the rings of formula I, have the meaning of $R^7$, whilst the other two thirds of the radicals $R^1$ have the meaning of $R^2$. Particularly preferably, the radicals $R^7$ are located uniformly in the 3-position. That arrangement, an example of the case in which the index n is six, is reproduced in formula VA.

The radicals $R^2$ are preferably alkyl, especially lower alkyl and, more especially, lower alkyl having from 4 to 7 carbon atoms, such as butyl, pentyl or hexyl.

The radicals $R^4$, $R^5$ and $R^8$ are preferably alkylene, especially lower alkylene and, more especially, lower alkylene having from 3 to 6 carbon atoms, such as 1,3-propylene, 1,2-propylene, 1,5-pentylene or 1,6-hexylene.

The index x is from 1 to 10 000, preferably from 1 to 1000, especially from 1 to 500, more especially from 1 to 200 or from 1 to 100, and even more especially from 2 to 85.

In connection with the sub-units of formula V, at least two of the radicals $R^4$, $R^5$ and $R^8$ must be unsubstituted or halogen-substituted alkylene or alkenylene. Also, preferably not more than about 50% of all radicals $R^4$, $R^5$ and $R^8$ are hydrogen. Especially preferably, not more than about 25% of all radicals $R^4$, $R^5$ and $R^8$ are hydrogen. Particularly preferably, none of the radicals $R^4$, $R^5$ and $R^8$ is hydrogen. Also particularly preferably, precisely two of the radicals $R^4$, $R^5$ and $R^8$ are unsubstituted or halogen-substituted alkylene or alkenylene. Those radicals are preferably the two $R^8$ radicals.

A preferred combination of meanings for the sub-units of formula V is as follows:

The radicals $R^4$ and $R^5$ are preferably alkyl or phenyl, especially lower alkyl, such as methyl or ethyl, or phenyl. An especially preferred meaning of the radicals $R^4$ and $R^5$ is lower alkyl having up to 4 carbon atoms, such as methyl. The radicals $R^8$ are alkylene, especially lower alkylene. Radicals of formula VI in which the radicals $R^4$, $R^5$ and $R^8$ have those meanings are derived from α,ω-dihydrogen-polysiloxanes.

Another preferred combination of meanings for the sub-units of formula V is as follows:

The radicals $R^4$, $R^5$ and $R^8$ are hydrogen, alkyl, alkylene or phenyl, especially hydrogen, lower alkyl, such as methyl or ethyl, lower alkylene, such as pentylene, or phenyl, with the proviso that a minimum of two of the radicals $R^4$, $R^5$ and $R^8$ are alkylene, especially lower alkylene, and preferably a maximum of 50% of the radicals $R^4$, $R^5$ and $R^8$ are hydrogen.

The present invention therefore relates especially to a contact lens comprising a crosslinked lipophilised cyclodextrin derivative which has repeating sub-units of formula V in which n is an integer of from 6 to 15, the radicals $R^1$ are each, independently of the others, hydrogen, $R^2$ or $R^7$ wherein, of the (3 times n) radicals $R^1$, at least one radical $R^1$ has the meaning of $R^7$ and the remaining radicals $R^1$ are hydrogen or have the meaning of $R^2$, $R^2$ being unsubstituted alkyl and $R^7$ being a di- or poly-valent radical of formula VI in which x is an integer of from 1 to 1000 and $R^4$, $R^5$ and $R^8$ are each, independently of the others, hydrogen, alkyl, alkylene or phenyl, at least two of the radicals $R^4$, $R^5$ and $R^8$ being alkylene.

Preferred among those is a contact lens comprising a crosslinked lipophilised cyclodextrin derivative which has repeating sub-units of formula V in which n is an integer of from 6 to 15, the radicals $R^1$ in the 2-position and in the 6-position are unsubstituted alkyl, the radicals $R^1$ in the 3-position have the meaning of $R^7$, x is an integer of from 1 to 1000 and $R^4$, $R^5$ and $R^8$ are each, independently of the others, hydrogen, alkyl, alkylene or phenyl, at least two of the radicals $R^4$, $R^5$ and $R^8$ being alkylene.

Also preferred among those is a contact lens comprising a crosslinked lipophilised cyclodextrin derivative which has repeating sub-units of formula V in which n is an integer of from 6 to 15, the radicals $R^1$ in the 2-position and in the 6-position are unsubstituted alkyl, and at least 50% of the radicals $R^1$ in the 3-position have the meaning of $R^7$ whilst the remaining percentage of the radicals $R^1$ in the 3-position are unsubstituted alkyl, x is an integer of from 1 to 1000 and $R^4$, $R^5$ and $R^8$ are each, independently of the others, hydrogen, alkyl, alkylene or phenyl, at least two of the radicals $R^4$, $R^5$ and $R^8$ being alkylene.

Furthermore preferred among those is a contact lens comprising a crosslinked lipophilised cyclodextrin derivative which has repeating sub-units of formula V in which n is an integer of from 6 to 15, the radicals $R^1$ in the 3-position are hydrogen, the radicals $R^1$ in the 2-position and in the 6-position have the meaning of $R^7$, x is an integer of from 1 to 1000 and $R^4$, $R^5$ and $R^8$ are each, independently of the others, hydrogen, alkyl, alkylene or phenyl, at least two of the radicals $R^4$, $R^5$ and $R^8$ being alkylene.

The present invention relates especially preferably to a contact lens comprising a crosslinked lipophilised cyclodextrin derivative which has repeating sub-units of formula V in which n is an integer of from 6 to 15, the radicals $R^1$ are each, independently of the others, hydrogen, $R^2$ or $R^7$ wherein, of the (3 times n) radicals $R^1$, from 50% to 100% of a third of those radicals have the meaning of $R^7$ whilst the other radicals $R^1$ are hydrogen or have the meaning of $R^2$, $R^2$ being unsubstituted alkyl and $R^7$ being a di- or poly-valent radical of formula VI in which x is an integer of from 1 to 500 and $R^4$, $R^5$ and $R^8$ are each, independently of the others, hydrogen, alkyl, alkylene or phenyl, at least two of the radicals $R^4$, $R^5$ and $R^8$ being alkylene.

The present invention therefore relates most especially to a contact lens comprising a crosslinked lipophilised cyclodextrin derivative which has repeating sub-units of formula VII

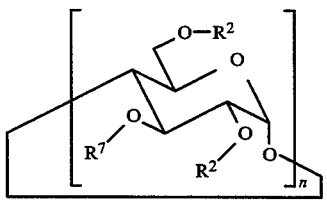 (VII)

wherein
n is an integer of from 6 to 15,
$R^2$ is unsubstituted alkyl, and
$R^7$ is a divalent radical of formula VIII

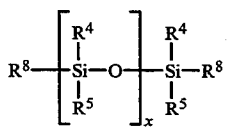 (VIII)

wherein x is an integer of from 1 to 500, $R^4$ and $R^5$ are each, independently of the other, alkyl or phenyl, and $R^8$ is alkylene.

The index n in a compound of formula VII is preferably 6, 7 or 8.

Equally, the present invention relates also to a contact lens comprising a crosslinked lipophilised cyclodextrin derivative which has repeating sub-units of formula VII as defined above, wherein $R^7$ is a di- or poly-valent radical of formula VI as defined above in which x is an integer of from 1 to 500, and the radicals $R^4$, $R^5$ and $R^8$ are hydrogen, alkyl, alkylene or phenyl, with the proviso that a minimum of two of the radicals $R^4$, $R^5$ and $R^8$ are alkylene and a maximum of about 25% of the radicals $R^4$, $R^5$ and $R^8$ are hydrogen.

The present invention relates especially to a contact lens comprising a crosslinked lipophilised cyclodextrin derivative which has repeating sub-units of formula VII wherein $R^7$ is a divalent radical of formula VII, in which formulae n is an integer 6, 7 or 8, $R^2$ is lower alkyl having from 4 to 7 carbon atoms, x is an integer of from 1 to 200, $R^4$ and $R^5$ are each, independently of the other, lower alkyl or phenyl, and $R^8$ is lower alkylene having from 3 to 6 carbon atoms.

The cyclodextrins of which a partial formula is shown in formula A are commercially available as are also the hydrogen-polysiloxanes of formulae II and IV. The compounds of formulae II and IV that are not commercially available can be prepared in a manner known per se.

The crosslinked lipophilised cyclodextrin derivatives from which the contact lenses according to the invention can be produced can be obtained, for example, as follows:

The radicals $R^2$ and $R^3$ are introduced into a cyclodextrin in an appropriate manner by alk(en)ylation. This can be effected simultaneously with a mixture of an alkylation agent and an alkenylation agent, or sequentially with an alkylation agent and with an alkenylation agent. For example, a cyclodextrin can first of all be converted into a compound of formula I wherein two thirds of the radicals $R^1$ are alkyl and the remaining third of the radicals $R^1$ are hydrogen. The conversion of the radicals $R^1$ representing hydrogen into radicals $R^3$ can then be carried out by reaction with an alkenylation agent.

Alternatively, a cyclodextrin can first of all be converted into a compound of formula I wherein two thirds of the radicals $R^1$ are alkyl and the remaining third of the radicals $R^1$ are hydrogen. The conversion of the radicals $R^1$ representing hydrogen into radicals $R^2$ or $R^3$ can then be carried out by reaction with a mixture of an alkylation agent and an alkenylation agent.

Alkylation agents and alkenylation agents are reactive esters of the alkyl and alkenyl compounds respectively, e.g. sulfonic acid esters or hydrohalic acid esters, such as alkyl and alkenyl sulfonates or bromides, especially e.g. lower alkyl bromides such as 1-bromo-n-pentane or 1-bromo-n-pentene.

The alkylation or alkenylation is carried out under conditions typical for that purpose that are familiar to the person skilled in the art, for example in an inert solvent, such as an ether, e.g. tetrahydrofuran, at a temperature of from 0° C. to the boiling temperature of the solvent used and, where appropriate, under inert gas, such as a nitrogen atmosphere.

As a result a cyclodextrin derivative is obtained thus which comprises at least one carbon-carbon double bond per macromolecule, preferably 6, 7 or 8 such double bonds per macromolecule, that is to say as many such double bonds as correspond to the preferred meaning of the index n in formula I.

The cyclodextrin derivatives of formula I so obtained are then reacted with a compound of formula II. For that purpose either approximately equimolar amounts are used, based on the number of carbon-carbon double bonds in the compounds of formula I and the number of silicon-hydrogen bonds in compounds of formula II, or a molar excess of one or the other component is used. In that reaction in each case an Si—H bond can be added to a C—C double bond and in that manner the cyclodextrin derivatives of formula I are crosslinked with one another by way of siloxane bridges.

That reaction also takes place in a manner known per se, e.g. according to J. L. Speier, Adv. Organomet. Chem. 17, 407 (1979). There are preferably used, for example, an inert solvent, such as a hydrocarbon, e.g. toluene, at a temperature of from 0° C. to the boiling temperature of the solvent used and, where appropriate, inert gas, such as a nitrogen atmosphere. The reaction is usually carried out in the presence of a catalyst. Platinum, platinum compounds or platinum complexes, such as e.g. cis-bis(styrolo)dichloroplatinum, are especially suitable catalysts.

The duration of the reaction is from a few minutes up to a few days, e.g. from 2 minutes to 5 days, depending on the circumstances.

The hydrosilylation reaction, which results in polymerisation, may be carried out, for example, on a rotating plate heated to a temperature of up to about 100° C. In that manner it is possible to obtain films of different thicknesses which are a lipophilised cyclodextrin/polysiloxane network. That network is the crosslinked lipophilised cyclodextrin derivative, obtainable from the compounds of formulae I and II, from which the contact lenses according to the invention can be produced.

In order to improve the mechanical properties, fillers, for example amorphous quartz powder, such as aerosil, for example having a particle size of from 10 to 100 nm, or titanium dioxide, may be added to the networks, and thus also to the contact lenses according to the invention.

The networks can also be polymerised in another manner known per se, for example in cylindrical shape, for example by subjecting them in closed cylindrical moulds (tubes) to a temperature programme in which the temperature is increased in steps from 30° C. to about 100° C. The temperature steps may, for example, be of from 5° to 10° C., with a residence time of from 1 to 12 hours per temperature. 2 or 5-hour periods are customary, but individual temperatures may also be maintained for up to 20 hours. Tempering at from 80° to 130° C. is usually carried out for from 1 to 15 hours at the end.

The manufacture of contact lenses of the invention can also be carried out in a manner known per se. For that purpose e.g. the compounds of formulae I and II are polymerised in cylindrical moulds and, after releasing from the moulds, the so-obtainable rods are divided into discs or buttons which can be further processed mechanically, especially by turning processes. In addition, the lenses according to the invention can also be manufactured by other processes known per se, such as casting in static moulds, spin casting, compressing, deep-drawing, thermoforming, turning or laser machining. Those process steps are known per se and detailed explanation is therefore not required for the person skilled in the art.

The manufacture is carried out preferably, but not necessarily, under an inert atmosphere when using open moulds. If closed moulds are used for the formation of the polymer, the moulds are advantageously made of inert materials exhibiting low oxygen permeability and non-adhesive properties. Examples of suitable mould materials are polytetrafluoroethylene, such as Teflon ®, silicone rubber, polyethylene, polypropylene and polyesters such as Mylar ®. If a suitable mould-release agent is employed, moulds made of glass and metal can also be used.

Casting in static moulds may, for example, if moulds having an inner and outer curve are used, give contact lenses directly. Thus contact lenses can be produced directly by polymerisation of the compounds of formulae I and II in suitable moulds ("full mould" process) or with only one finished surface ("semi-mould" process).

Spin casting can also be used in accordance with the invention by introducing a solution of the compounds of formulae I and II into a spin casting mould and then spinning the mould, in the course of which the solvent evaporates. The finished contact lens, of which the dimensions can be controlled by the dimensions of the mould, the speed of rotation and the viscosity of the solution introduced, remains in the mould.

Compression is effected in accordance with the invention e.g. by compression-moulding a sheet of the network. A sheet of the network can be produced as described above or in a manner known per se by casting a solution of the compounds of formulae I and II.

From a sheet produced e.g. as mentioned above it is possible to produce a contact lens, also in a manner known per se, by deep-drawing or thermoforming.

Turning, also, is a possible final process step for the manufacture of contact lenses according to the invention. This is used if a blank obtainable e.g. in accordance with one of the processes mentioned above requires further machining. The term "turning" is understood to mean the machining down, known per se, of contact lens blanks. Appropriate blanks can be produced, e.g., by the extrusion of round rods and the division thereof, or by casting from a solution. The term "contact lens blank" in this context covers buttons or semi-mould products, such as e.g. blanks having an inner curve. Typical blanks have thicknesses of 4 or 6 mm and diameters of from 10 to 17, e.g. 12 or 14, mm.

It is also possible in accordance with the invention to employ laser machining, using blanks, or using contact lenses produced according to one of the other processes if those lenses require an additional fine machining of their surface.

The following Examples illustrate the subject of the invention without limiting it to the scope of the Examples. Percentage Figures are percentages by weight unless expressly specified otherwise. Temperatures are in degrees Celsius.

Contact angles are determined in accordance with the following procedure: The contact lens is cleaned with acetone. In the measuring chamber of the contact angle-measuring microscope a drop of distilled water is placed on the surface of the contact lens. The developing drop is measured against the surface of the contact lens Oxygen permeabilities (Dk values) are quoted in the unit "($cm^3O_2.cm^2/cm^2.sec.mmHg$)", oxygen transmissibilities in the unit "($mlO_2.cm/ml.sec.mmHg$)".

Example 1: Heptakis-(2,6-di-O-n-pentyl)-β-cyclodextrin is prepared from β-cyclodextrin in a manner known per se (e.g. according to Carbohydrate Research 214, 257 (1991)). That compound is refluxed for 4 days in tetrahydrofuran with sodium hydride and 1-bromopent-4-ene under nitrogen. The reaction product, heptakis-(2,6-di-O-n-pentyl-3-O-(ω-pentenyl))-β-cyclodextrin, is obtained in a yield of 68% after working up and after column chromatography in which silica gel Merck Si-60 and petroleum ether/tert-butyl methyl ether (88:12 v/v) are used. The $^1$H-NMR data support the suggested configuration.

In the subsequent step, the 7 carbon-carbon double bonds per β-cyclodextrin are crosslinked. For that purpose heptakis-(2,6-di-O-n-pentyl-3-O-(ω-pentenyl))-β-cyclodextrin with an equivalent amount of α,ω-dihydrogen-polydimethylsiloxane, degree of polymerisation =20, produced according to S. W. Kantor et al., J. Am. Chem. Soc. 76, 5190 (1954), is dissolved in a small amount of toluene under nitrogen. $1 . 10^{-4}$ mol percent of cis-bis-(styrolo)dichloro-platinum, prepared in accordance with A. Albinati et al., Organo Metallics 6, 788 (1987) are added as catalyst. The solution is stable for 7 days at 20° C. To initiate the hydrosilylation reaction, the solution is poured onto a hot rotating plate. At a temperature of 60° C. the reaction is complete after 2 minutes. A colourless, transparent, rubbery film of the lipophilised cyclodextrin/siloxane network is obtained. The film has a thickness of from 50 to 200 μm and comprises up to 15% β-cyclodextrin.

Example 2: Hexakis-(2,6-di-O-n-pentyl)-α-cyclodextrin is prepared in a manner known per se from α-cyclodextrin. A mixture of that compound with sodium hydride in tetrahydrofuran and with a 1:5 mixture (mole/mole) of 1-bromo-n-pent-4-ene and 1-bromo-n-pentane is heated under reflux for 4 days. After working up and after column chromatography in which silica gel Merck Si-60 and petroleum ether/tert-butyl methyl ether (90:10 v/v) are used, hexakis-(2,6-di-O-n-pentyl)-3A-O-(ω-pentenyl)-3B,3C,3D,3E,3F-penta-O-n-pentyl-α-cyclodextrin is obtained as the main product in a yield of 74%. The $^1$H-NMR data support the suggested configuration.

For the hydrosilylation reaction, a linear statistical co-(dimethylsiloxane)/(hydromethylsiloxane) polymer (PS 123.5, Petrarch) is used which comprises 9.8 mol % hydromethylsiloxane units (called "Sample 1" in the following Table). Analogously to Example 1, the siloxane is reacted with the monofunctionalised α-cyclodextrin in the presence of cis-bis(styrolo)dichloro-platinum as catalyst.

In a first experiment, 1 equivalent of Si—H groups of the siloxane is treated at 60° C. in toluene with 0.5 equivalent of C—C double bonds of the functionalised a-cyclodextrin. The product obtained from that experiment is called "Sample 2" in the following Table. In a second experiment, the compounds are used in a ratio of 1:1.1. The product obtained from that experiment is called "Sample 3" in the following Table. The reactions are almost complete after 5 days. The reaction mixtures are washed with water. The products of the two experiments are isolated using preparative gel permeation chromatography (GPC) with a Styragel HPLC column and tetrahydrofuran. The composition of the copolymers is ascertained by $^1$H-NMR spectroscopy. The integrals of the signals at δ=4.67 ppm ($CH_3Si$—H), at δ=0.49 ppm ($CH_3Si$—($CH_2$)—) and δ=0.06 ppm ($CH_3Si$) are evaluated in order to ascertain the content of unreacted hydromethylsiloxane units, units with bonded cyclodextrins and dimethylsiloxane units; see Table to this Example. The molecular weight of the polymers was measured by GPC in toluene for which a PDMS calibration (polydimethylsiloxane calibration) was used.

TABLE to Example 2
Composition and molecular weight of the polymer Samples 1 to 3

| Sample | K* | L* | M* | MW* (GPC) |
|---|---|---|---|---|
| 1 | 90% | 9.8% | — | 2336 |
| 2 | 90% | 4.5% | 5.4% | 4850 |
| 3 | 90% | 0.1% | 9.6% | 5872 |

*K: content of dimethylsiloxane units,
*L: content of unreacted hydromethylsiloxane units
*M: content of units with bonded cyclodextrins
*MW: molecular weight, determined by GPC Example 3: A contact lens is produced as follows from the modified cyclodextrin obtainable in accordance with Example 1: The described solution, which is stable at 20° C. for 7 days, is introduced into a geometrically stable mould. The mould is closed and heated. The heating can be effected by heat radiation (infrared), in a water bath, or, in the case of metal moulds, by induction. If the mould materials permit, the crosslinking can also be carried out under pressure.

At the temperatures indicated below the reaction is complete after the following times:

| Temperature (°C.) | 30 | 40 | 50 | 60 | 80 | 100 |
|---|---|---|---|---|---|---|
| Time (h) | 48 | 6 | 1 | 0.5 | 0.25 | 0.1 |

Example 4: Analogously to. Example 3, contact lenses are produced from a cyclodextrin/siloxane network obtained by reacting compounds of formula III with compounds of formula IV, the variables of formula III having the following meanings: n is 7, the two radicals $R^2$ are pentyl and $R^3$ is allyl, and the variables of formula IV having the following meanings: $R^4$ and $R^5$ are methyl, and x is the integer 5, 11, 17, 37, 41, 82 or 100. The following parameters are given below for the contact lenses produced in each case:

Value of the index x, ratio of Si—H bonds to C—C double bonds (referred to hereinafter as "SiH/CC"), proportion by weight of the cyclodextrin compounds of formula III (referred to hereinafter as "% CDX"), proportion by weight of the polydimethylsiloxane compound of formula IV (referred to hereinafter as "% PDMS"). Also, if determined, the contact angle, the Dk value and the Dk/L value are given.

a) x=5, SiH/CC=1.94, % CDX=47%, % PDMS=53%: contact angle 85°, Dk value 200, Dk/L value 126.

b) x=5, SiH/CC=0.96, % CDX=64%, % PDMS=36%: contact angle 95°, Dk value 78, Dk/L value 56.

c) x=11, SiH/CC=1.26, % CDX=38%, % PDMS=62%: contact angle 80°, Dk value 163, Dk/L value 115.

d) x=17, SiH/CC=1.00, % CDX=33%, % PDMS=67%: contact angle 80°, Dk value 236, Dk/L value 130.

e) $x=37$, SiH/CC=0.53, % CDX=32%, % PDMS=68%: contact angle 95°, Dk value 326, Dk/L value 113.

f) $x=41$, SiH/CC=1.07, % CDX=17%, % PDMS=83%: contact angle 96°.

g) $x=82$, SiH/CC=1.02, % CDX=10%, % PDMS=90%: contact angle 97°.

h) $x=100$, SiH/CC=0.97, % CDX=9%, % PDMS=91%.

Example 5: Analogously to Example 3, contact lenses are produced from a cyclodextrin/siloxane network obtained by reacting compounds of formula III with compounds of formula II, the variables of formula III having the meanings given in Example 4. There is used as compound of formula II linear statistical co-(phenylmethylsiloxane)/(hydromethylsiloxane) polymer 50:50, $M_n=1146$, (PS 129.5, Petrarch), which comprises approximately 50 mol % hydromethylsiloxane units. In the following the further parameters are given analogously to Example 4:

SiH/CC=1.05, % CDX=46%, % PDMS=54%: contact angle 94°.

Example 6: Analogously to Example 3, contact lenses are produced from a cyclodextrin/siloxane network obtained by reacting compounds of formula III with compounds of formula II, the variables of formula III having the following meanings: n is 7, the two radicals $R^2$ are pentyl and $R^3$ is pentenyl, and the variables of formula II having the following meanings: $R^6$ is hydrogen, $R^4$ is hydrogen or methyl and $R^5$ is methyl and x is the integer 5, 11, 17 or 37. In the following the further parameters for the contact lenses produced in each case are given as in Example 4:

a) $x=5$, SiH/CC=1.01, % CDX=65%, % PDMS=35%: contact angle 90°, Dk value 158, Dk/L value 116.

b) $x=11$, SiH/CC=1.29, % CDX=40%, % PDMS=60%: contact angle 87°.

c) $x=17$, SiH/CC=0.52, % CDX=50%, % PDMS=50%: Dk value 215, Dk/L value 127.

d) $x=17$, SiH/CC=1.01, % CDX=34%, % PDMS=66%: contact angle 100°, Dk value 362, Dk/L value 143.

e) $x=37$, SiH/CC=0.55, % CDX=32%, % PDMS=68%: contact angle 100°, Dk value 476, Dk/L value 149.

f) $x=37$, SiH/CC=0.50, % CDX=35%, % PDMS=65%: Dk value 425, Dk/L value 160.

Example 7: Analogously to Example 3, contact lenses are produced from a cyclodextrin/siloxane network obtained by reacting compounds of formula III with compounds of formula II, the variables of formula III having the meanings given in Example 6. There is used as compound of formula II linear statistical co-(phenylmethylsiloxane)/(hydromethylsiloxane) polymer 50:50, $M_n=1146$, (PS 129.5, Petrarch), which comprises about 50 mol % hydromethylsiloxane units. In the following the further parameters are given analogously to Example 4:

SiH/CC=1.05, % CDX=48%, % PDMS=52%.

Example 8: Analogously to Example 3, contact lenses are produced from a cyclodextrin/siloxane network obtained by reacting compounds of formula I with compounds of formula IV, the variables of formula I having the following meanings: n is 7, the two radicals $R^1$ in positions 2 and 6 are pentyl, 40% of the radicals $R^1$ in position 3 are pentyl and 60% of the radicals $R^1$ in position 3 are pentenyl, and the variables of formula IV having the following meanings: $R^4$ and $R^5$ are methyl, and x is the integer 5, 11, 17, 37, 82 or 100. In the following the further parameters for the contact lenses produced in each case are given as in Example 4:

a) $x=5$, SiH/CC=1.05, % CDX=75%, % PDMS=25%: contact angle 95°.

b) $x=11$, SiH/CC=1.27, % CDX=53%, % PDMS=47%: contact angle 79°.

c) $x=17$, SiH/CC=0.97, % CDX=47%, % PDMS=53%.

d) $x=37$, SiH/CC=0.91, % CDX=33%, % PDMS=67%.

e) $x=82$, SiH/CC=1.01, % CDX=17%, % PDMS=83%: contact angle 100°.

f) $x=100$, SiH/CC=0.99, % CDX=14%, % PDMS=86%: contact angle 100°.

Example 9: Analogously to Example 3, contact lenses are produced from a cyclodextrin/siloxane network obtained by reacting compounds of formula I with compounds of formula II, the variables of formula I having the meanings given in Example 8. There is used as compound of formula II linear statistical co-(phenylmethylsiloxane)/(hydromethylsiloxane) polymer 50:50, $M_n=1146$, (PS 129.5, Petrarch), which comprises about 50 mol % hydromethylsiloxane units. In the following, the further parameters are given analogously to Example 4:

SiH/CC=2.11, % CDX=43%, % PDMS=57%: contact angle 90°.

Example 10: Analogously to Example 3, contact lenses are produced from a cyclodextrin/siloxane network obtained by reacting compounds of formula I with compounds of formula IV, the variables of formula I having the following meanings: n is 7, two of the three radicals $R^1$ are pentenyl and the remaining radicals $R^1$ are hydrogen, and the variables of formula IV having the following meanings: $R^4$ and $R^5$ are methyl, and x is the integer 2, 5, 11, 82 or 100. In the following the further parameters for the contact lenses produced in each case are given as in Example 4:

a) $x=2$, SiH/CC=0.98, % CDX=69%, % PDMS=31%: Dk value 20, Dk/L value 30.

b) $x=5$, SiH/CC=1.28, % CDX=37%, % PDMS=63%: contact angle 93°.

c) $x=11$, SiH/CC=1.04, % CDX=25%, % PDMS=75%.

d) $x=82$, SiH/CC=1.05, % CDX=4%, % PDMS=96%: contact angle 96°.

e) $x=100$, SiH/CC=0.25, % CDX=14%, % PDMS=86%.

f) $x=100$, SiH/CC=0.59, % CDX=6%, % PDMS=94%.

Example 11: Analogously to Example 3, contact lenses are produced from a cyclodextrin/siloxane network obtained by reacting compounds of formula I with compounds of formula II, the variables of formula I having the meanings given in Example 10. There is used as compound of formula II linear statistical co-(phenylmethylsiloxane)/(hydromethylsiloxane) polymer 50:50, $M_n=1146$, (PS 129.5, Petrarch), which comprises about 50 mol % hydromethylsiloxane units. In the following the further parameters are given analogously to Example 4:

SiH/CC=0.21, % CDX=65%, % PDMS=35%: contact angle 86°.

What is claimed is:

1. A contact lens comprising a crosslinked lipophilised cyclodextrin derivative which has repeating sub-units of formula V

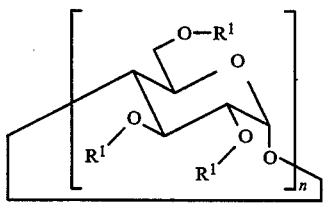

(V)

in which
n is an integer from 6 to 15,
the radicals $R^1$ are each, independently of the others, hydrogen, $R^2$ or $R^7$ wherein, of the (3 times n) radicals $R^1$, at least one radical $R^1$ has the meaning of $R^7$ and the remaining radicals $R^1$ are hydrogen or have the meaning of $R^2$,
$R^2$ being unsubstituted or halogen-substituted alkyl or alkyl-substituted aryl and $R^7$ being a hydrosilylizable moiety of the formula VI

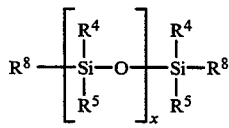

(VI)

in which
x is an integer from 1 to 10,000, and
$R^4$, $R^5$, and $R^8$ are each, independently of the others, hydrogen, alkyl, alkylene, phenyl, or hydroxy, with the proviso that at least two of the radicals $R^4$, $R^5$, and $R^8$ in a moiety of formula VI are unsubstituted or halogen-substituted alkylene or alkenylene,
such that sub-unit of formula V and moiety of formula VI can be combined through hydrosilylation.

2. A contact lens according to claim 1, comprising a crosslinked lipophilised cyclodextrin derivative which has repeating sub-units of formula V in which
n is an integer of from 6 to 15,
the radicals $R^1$ are each, independently of the others, hydrogen, $R^2$ or $R^7$ wherein, of the (3 times n) radicals $R^1$, at least one radical $R^1$ has the meaning of $R^7$ and the remaining radicals $R^1$ are hydrogen or have the meaning of $R^2$,
$R^2$ being unsubstituted alkyl and
$R^7$ being a di- or poly-valent moiety of formula VI in which
x is an integer of from 1 to 1000 and
$R^4$, $R^5$ and $R^8$ are each, independently of the others, hydrogen, alkyl, alkylene or phenyl, at least two of the radicals $R^4$, $R^5$ and $R^8$ being alkylene.

3. A contact lens according to claim 1, comprising a crosslinked lipophilised cyclodextrin derivative which has repeating sub-units of formula V in which
n is an integer of from 6 to 15,
the radicals $R^1$ in the 2-position and in the 6-position are unsubstituted alkyl, the radicals $R^1$ in the 3-position have the meaning of $R^7$,
x is an integer of from 1 to 1000 and
$R^4$, $R^5$ and $R^8$ are each, independently of the others, hydrogen, alkyl, alkylene or phenyl, at least two of the radicals $R^4$, $R^5$ and $R^8$ being alkylene.

4. A contact lens according to claim 1, comprising a crosslinked lipophilised cyclodextrin derivative which has repeating sub-units of formula V in which
n is an integer of from 6 to 15,
the radicals $R^1$ in the 2-position and in the 6-position are unsubstituted alkyl, and at least 50% of the radicals $R^1$ in the 3-position have the meaning of $R^7$ whilst the remaining percentage of the radicals $R^1$ in the 3-position are unsubstituted alkyl,
x is an integer of from 1 to 1000 and
$R^4$, $R^5$ and $R^8$ are each, independently of the others, hydrogen, alkyl, alkylene or phenyl, at least two of the radicals $R^4$, $R^5$ and $R^8$ being alkylene.

5. A contact lens according to claim 1, comprising a crosslinked lipophilised cyclodextrin derivative which has repeating sub-units of formula V in which
n is an integer of from 6 to 15,
the radicals $R^1$ in the 3-position are hydrogen, the radicals $R^1$ in the 2-position and in the 6-position have the meaning of $R^7$,
x is an integer of from 1 to 1000 and
$R^4$, $R^5$ and $R^8$ are each, independently of the others, hydrogen, alkyl, alkylene or phenyl, at least two of the radicals $R^4$, $R^5$ and $R^8$ being alkylene.

6. A contact lens according to claim 1, comprising a crosslinked lipophilised cyclodextrin derivative which has repeating sub-units of formula V in which
n is an integer of from 6 to 15,
the radicals $R^1$ are each, independently of the others, hydrogen, $R^2$ or $R^7$ wherein of the (3 times n) radicals $R^1$, from 16.6% to 33.3% of all $R^1$ radicals have the meaning of $R^7$ whilst the other radicals $R^1$ have the meaning of hydrogen or $R^2$,
$R^2$ being unsubstituted alkyl and
$R^7$ being a di- or poly-valent moiety of formula VI in which
x is an integer of from 1 to 500 and
$R^4$, $R^5$ and $R^8$ are each, independently of the others, hydrogen, alkyl, alkylene or phenyl, at least two of the radicals $R^4$, $R^5$ and $R^8$ being alkylene.

7. A contact lens according to claim 1, comprising a crosslinked lipophilised cyclodextrin derivative which has repeating sub-units of formula VII

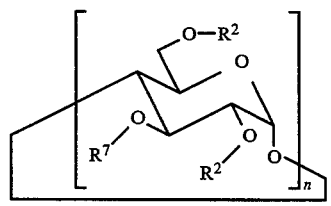

(VII)

in which
n is an integer of from 6 to 15,
$R^2$ is unsubstituted alkyl, and
$R^7$ is a hydrosilylizable moiety of formula VIII

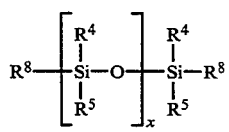

(VIII)

in which
x is an integer of from 1 to 500, $R^4$ and $R^5$ are each, independently of the other, alkyl or phenyl, and $R^8$ is alkylene.

8. A contact lens according to claim 7, comprising a crosslinked lipophilised cyclodextrin derivative which has repeating sub-units of formula VII wherein $R^7$ is a divalent moiety of formula VIII, in which formulae n is an integer 6, 7 or 8, $R^2$ is lower alkyl having from 4 to 7 carbon atoms, x is an integer of from 1 to 200, $R^4$ and $R^5$ are each, independently of the other, lower alkyl or phenyl, and $R^8$ is lower alkylene having from 3 to 6 carbon atoms.

9. A process, for the manufacture of a contact lens according to claim 1, which comprises processing in a manner known per se, to form a contact lens, a crosslinked lipophilised cyclodextrin derivative which has repeating sub-units of formula V

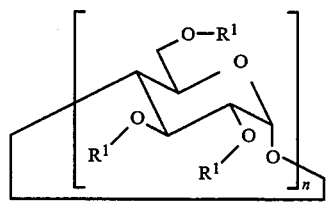

(V)

in which n is an integer of from 6 to 15, the radicals $R^1$ are each, independently of the others, hydrogen, $R^2$ or $R^7$ wherein, of the (3 times n) radicals $R^1$, at least one radical $R^1$ has the meaning of $R^7$ and the remaining radicals $R^1$ are hydrogen or have the meaning of $R^2$, $R^2$ being unsubstituted or halogen-substituted alkyl or alkyl-substituted aryl and $R^7$ being a hydrosilylizable moiety of formula VI

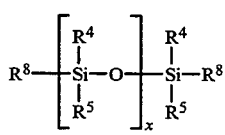

(VI)

in which x is an integer of from 1 to 10 000, and $R^4$, $R^5$ and $R^8$ are each, independently of the others, hydrogen, alkyl, unsubstituted or halogen-substituted alkylene or alkenylene, phenyl or hydroxy, with the proviso that at least two of the radicals $R^4$, $R^5$ and $R^8$ in a radical of formula VI are unsubstituted or halogen-substituted alkylene or alkenylene.

10. A contact lens comprising a crosslinked lipophilised cyclodextrin derivative which is obtainable by reacting a compound of formula I

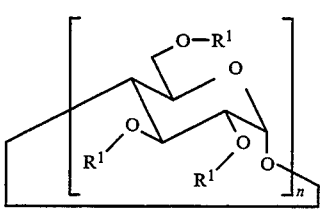

(I)

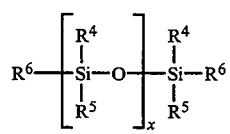

(II)

in which formulae n is an integer of from 6 to 15, the radicals $R^1$ are each, independently of the others, hydrogen, $R^2$ or $R^3$, wherein, of the (3 times n) radicals $R^1$, at least one radical $R^1$ has the meaning of $R^3$ and the remaining radicals $R^1$ are hydrogen or have the meaning of $R^2$, $R^2$ being unsubstituted or halogen-substituted alkyl or alkyl-substituted aryl and $R^3$ being unsubstituted or halogen-substituted alkenyl, x is an integer from 1 to 10,000, and $R^4$, $R^5$, and $R^6$ are each, independently of the others, hydrogen, alkyl, phenyl or hydroxy, with the proviso that at least two of the radicals $R^4$, $R^5$, and $R^6$ in a compound of formula II are hydrogen, such that subunit of formula I and moiety of formula II can be combined through hydrosilylation.

11. A contact lens according to claim 1, comprising a crosslinked lipophilised cyclodextrin derivative which has repeating sub-units of formula VII

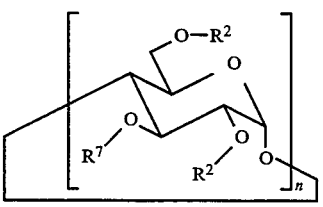

(VII)

in which n is an integer from 6 to 15, $R^2$ is an unsubstituted alkyl, and $R^7$ is a hydrosilylizable moiety of formula VI

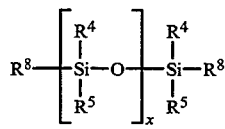

(VI)

in which x is an integer from 1 to 500, and the radicals $R^4$, $R^5$, and $R^8$ are each, independently of the others, hydrogen, alkyl, alkylene, or phenyl, with the proviso that a minimum of two of the radicals $R^4$, $R^5$, and $R^8$ are alkylene and a maximum of 25% of the radicals $R^4$, $R^5$, and $R^8$ are hydrogen.

* * * * *